United States Patent [19]
Rozanski

[11] Patent Number: 5,530,926
[45] Date of Patent: Jun. 25, 1996

[54] METHOD FOR OPERATING A SWITCHED DIVERSITY RF RECEIVER

[75] Inventor: Walter J. Rozanski, Hurst, Tex.

[73] Assignee: Motorola, Inc., Schaumburg, Ill.

[21] Appl. No.: 388,119

[22] Filed: Feb. 13, 1995

Related U.S. Application Data

[63] Continuation of Ser. No. 131,241, Oct. 4, 1993, abandoned.

[51] Int. Cl.⁶ .................................................. H04B 17/00
[52] U.S. Cl. ..................... 455/277.2; 370/95.3; 375/347
[58] Field of Search ........................... 455/277.1, 277.2, 455/272, 133, 134, 135, 140, 276.1, 278.1; 370/95.1; 375/100

[56] References Cited

U.S. PATENT DOCUMENTS

| | | | |
|---|---|---|---|
| 4,531,235 | 7/1985 | Brusen | 455/273 |
| 4,584,713 | 4/1986 | Bruckert et al. | 455/277 |
| 4,704,734 | 11/1987 | Menich et al. | 455/33 |
| 4,977,616 | 12/1990 | Linder et al. | 455/277 |
| 5,036,515 | 7/1991 | Freeburg | 455/277.1 |
| 5,109,390 | 4/1992 | Gilhousen et al. | 455/33.2 |
| 5,138,327 | 8/1992 | Chang et al. | 455/135 |
| 5,142,534 | 8/1992 | Simpson et al. | 370/95.1 |
| 5,203,024 | 4/1993 | Yamao | 455/133 |
| 5,222,078 | 6/1993 | Cason et al. | 375/76 |
| 5,239,541 | 8/1993 | Murai | 455/277.2 |

*Primary Examiner*—Edward F. Urban
*Attorney, Agent, or Firm*—Raymond J. Warren

[57] ABSTRACT

One of two antennas (11, 12) is selected (34) by comparing the quality of a first signal (32) preceding a desired signal, received through a first antenna (11), with the quality of a second signal (33) preceding the desired signal, received through the second antenna (12), if the accuracy (62) of a previous desired signal was bad. If the accuracy of the previous desired signal was good (62), but the quality failed to meet a threshold (52), then an antenna (11, 12) is selected (65) by comparing the quality (63) of the first signal preceding said desired signal received through the first antenna (11) with the quality (64) of the first signal preceding the desired signal received through the second antenna (12). If the accuracy of the previous desired signal was good (62) and the quality met the threshold (52), then the first antenna (11) is selected (53).

17 Claims, 4 Drawing Sheets

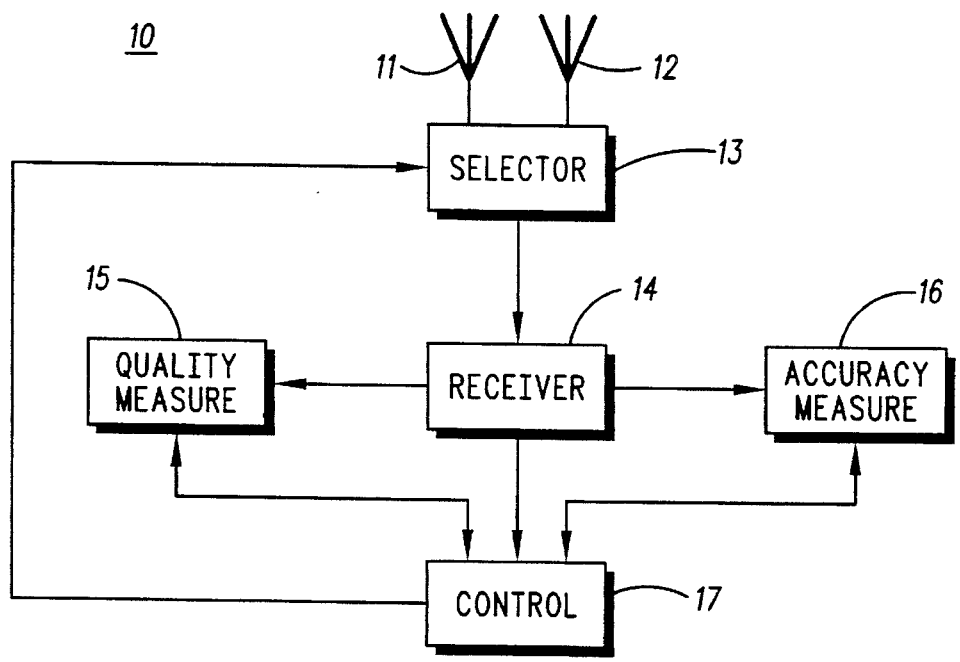
FIG.1
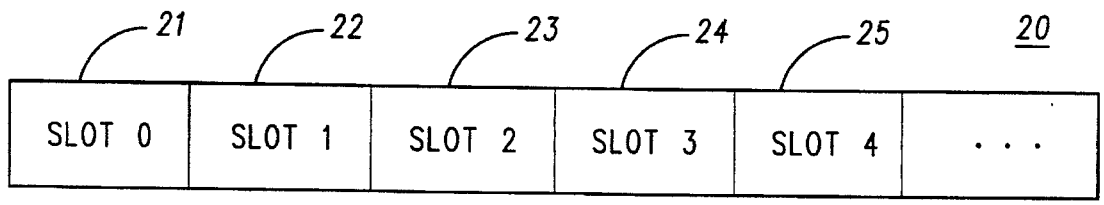
PRIOR ART FIG.2
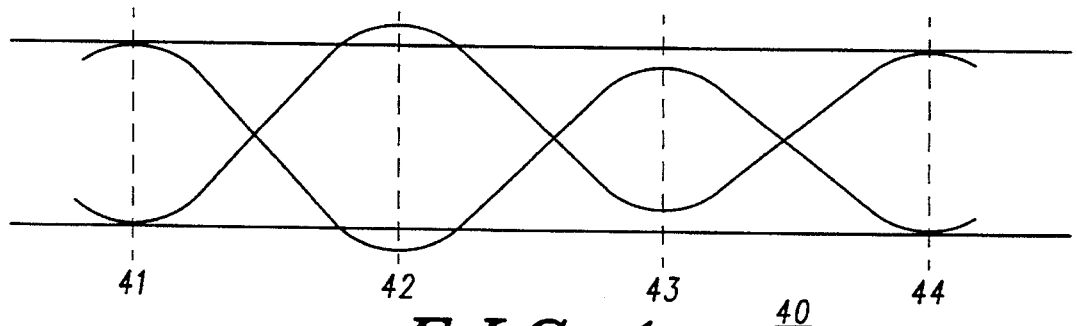
PRIOR ART FIG.4
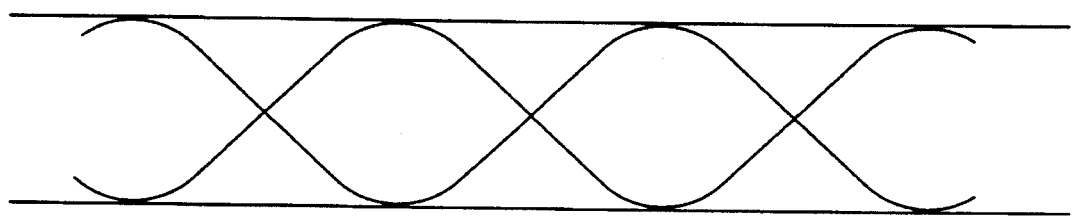
PRIOR ART FIG.5

5,530,926

METHOD FOR OPERATING A SWITCHED DIVERSITY RF RECEIVER

This is a continuation of application Ser. No. 08/131,241, filed Oct. 4, 1993, and now abandoned.

FIELD OF THE INVENTION

The present invention relates, in general, to Radio Frequency (RF) receivers and, more particularly, to a method for operating a switched diversity RF receiver.

BACKGROUND OF THE INVENTION

Diversity receiving is well known in the field of communications. There are several types of switched diversity including temporal and spatial switched diversity. In temporal diversity, the same signal is transmitted at two different times. For example in a time division multiple access/time division multiplexed (TDMA/TDM) system, the same signal would be transmitted in time slot 0 and time slot 1. The expectation here is that the interference will vary with time and one of the signals will be received better than the other. The receiver determines which signal was the best and processes that signal.

In spatial diversity, the same transmission is received at two different locations. Again, the expectation here is that the received signals will have taken different paths to the two locations and will have different interference effects. The receiver will determine which signal is the best and process that signal.

A variation of spatial diversity is using two antenna to measure other transmissions on the frequency that carries the signal of interest to the receiver. These measurements are then used to select an antenna to be used for reception of the desired signal.

One drawback of measuring other transmissions in a switched diversity process is that power is consumed by the receiver in order to make these other measurements. Even though the receiver is only interested in one signal transmitted on one channel, two other signals on two other channels must be measured to make the diversity decision. Therefore, this type of selection requires the use of additional power when making the measurements. In portable RF equipment, power consumption is a key concern. Therefore, it would be desirable to provide a portable RF receiver which would minimize the power consumed in performing the diversity function.

BRIEF DESCRIPTION OF THE DRAWINGS

FIG. 1 is a block diagram of an RF receiver designed to utilize the present invention;

FIG. 2 is a block diagram illustrating a TDMA transmission;

FIG. 4 is a prior art signal diagram representing eye patterns of a signal having poor quality;

FIG. 5 is a prior art signal diagram representing eye patterns of a signal having good quality;

DETAILED DESCRIPTION OF THE DRAWINGS

Figure 3:
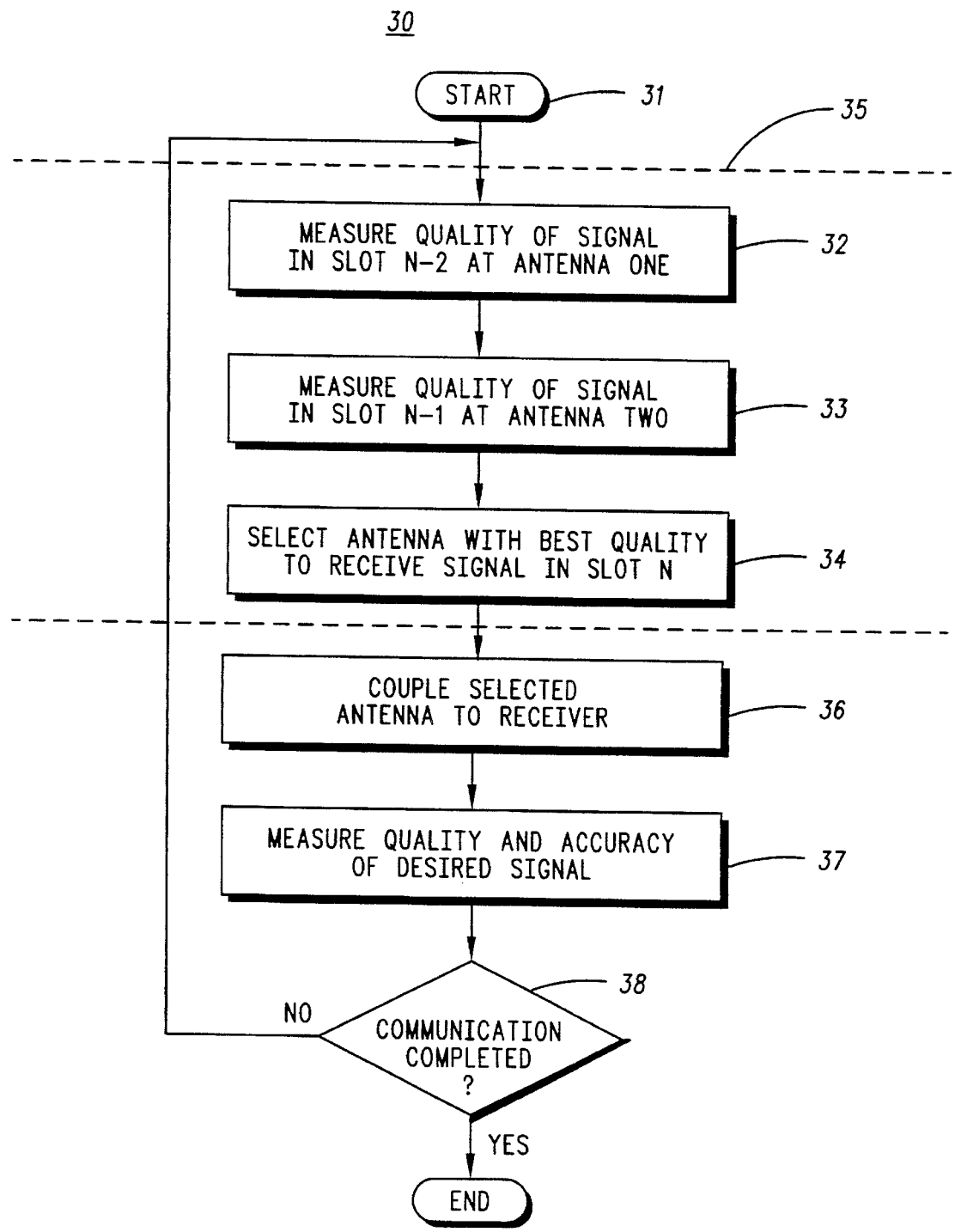
FIG. 3 is a flow chart representing a switched diversity process utilized in the prior art.

Referring initially to FIG. 1, a communication unit, generally designated 10, embodying the present invention is illustrated. Receiver 10 consists of a pair of antennas 11 and 12 coupled through a switch selector 13 to a receiver 14. The signal produced by receiver 14 is provided to a quality measure device 15 and an accuracy measure device 16. The outputs from the quality and accuracy measuring devices are provided to a controller 17 which uses the information to control various elements of communication unit 10.

For purposes of illustration, the operation of communication unit 10 will be described for a TDMA type of system; but may be used in other systems, such as code division multiple access (CDMA) systems. Signal quality measuring device 15 is used to measure the signal to interference ratio (C/I); and the accuracy measuring device 16 will be used to perform a cyclic redundancy check (CRC) on the received signal. It will be understood by those skilled in the art, however, that there exist other quality and accuracy parameters which may be substituted for those described above. For example, received signal strength indicator (RSSI), bit error rate (BER), and frame erasure rate, also referred to as frame error rate (FER), may all be used for one or both of the above parameters.

Referring now to FIG. 3, a flow chart representing a prior art switched diversity process, generally designated 30, is illustrated. Process 30 starts at step 31 each time it is about to receive a signal. For this example, the communication unit will be assigned slot 3, FIG. 2, as its TDMA communication channel.

Prior to the time when slot 3 would be received, communication unit 10 will make its diversity measurements. First, in step 32, antenna 11 is selected to provide the signal received in slot 1 to receiver 14. The output from receiver 14 is then measured for quality and the results provided to controller 17. Next, in step 33, antenna 12 is selected to provide the signal received in slot 2 to receiver 14. The signal from slot 2 is processed in the same way as the signal from slot 1; and the results are provided to controller 17.

The controller 17 will select the antenna with the best quality reception to couple to receiver 14. Steps 32 through 34 represent the antenna selection subprocess 35.

The quality measurement in this particular embodiment is a carrier-to-noise and interference (C/(N+I)) ratio. A carrier-to-interference (C/I) ratio may also be used. This is determined by measuring the "eye opening" of the received signal. This is represented graphically in FIGS. 4 and 5 by signal diagrams generally designated 40 and 49. Eye pattern 40 represents a signal having a low quality and eye pattern 49 represents a signal having a high quality. The measurements for the C/N+I ratio are taken at sample points 41 through 44 and 45 through 48. Interference in the system can cause the "eye" portion of the signal to be pushed outside the envelope maintained by the automatic gain control circuitry. Where this becomes a problem is at sample point 43 where the eye opening has become smaller as a result of the interference. Samples 41 through 44 would then have a poorer quality than a samples taken at the points 45 through 48. The quality is relative to how much the samples deviate from the ideal values represented by the straight horizontal lines. It should be noted, however, that a quality measure is not based upon a single sample point; but is based on an average over the entire slot being measured.

Once the antenna selection has been made, that antenna is coupled to the receiver to provide the desired signal to the receiver. When the desired signal is received, its quality and accuracy are measured as the above signals were measured.

The accuracy measure is a CRC type of measure. In a digital communication environment, a check sum is sent with the signal transmission to provide verification of the accuracy of the signal once recovered from the carrier signal. This is used since with interference; a strong signal may be received (i.e. have a good quality measure); but the data carried by the signal may be corrupted. Therefore, both measures are typically used in determining the acceptability of the desired signal.

Controller 17 then determines if the communication is completed, decision step 38. If the communication is completed, process 30 ends at step 39. If the communication is not completed, process 30 loops back to step 32 of subprocess 35.

Figure 6:
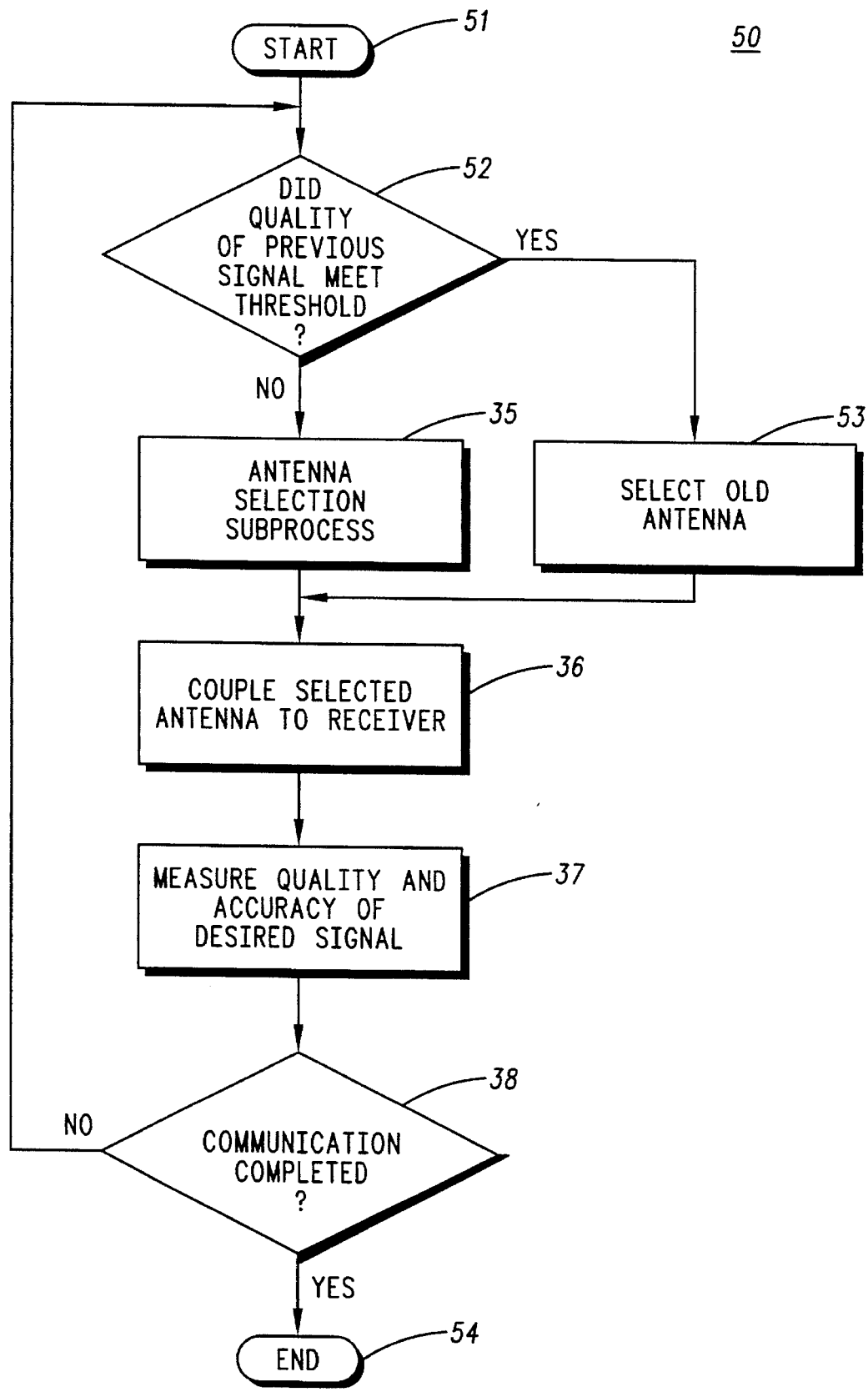
FIG. 6 is a flow chart representing one embodiment of a switched diversity process utilizing the present invention.

Presently, communication unit 10 will perform this process for each frame. However, performing the process in each frame requires a significant amount of power. Therefore, it would be desirable to implement switched diversity in a manner in which the power consumption may be reduced. One such solution to this problem is provided in the flow chart of FIG. 6 which represents one embodiment of a switched diversity process, generally designated 50, utilizing the present invention.

Process 50 provides a switched diversity method that eliminates the need to continually measure the preceding signals in order to select an antenna. In part, the operation of this process is based upon the fact that their is no down link (e.g. transmission from the base to the mobile) power control. Therefore, over a large part of a coverage are, the desired signal will be much stronger than the interference and noise. Hence, diversity won't be necessary. Only parts of the cell with marginal coverage will require that diversity be used.

Process 50 commences at step 51 and then determines if a quality measure of a previous signal meet a preset threshold requirement, decision step 52. If the quality measure was not met, then a regular diversity process, such as subprocess 35, is used. However, if the quality of the previous signal was sufficient, then the diversity measurements of the slots preceding the signal of interest are not made and the previous antenna selection is maintained, step 53.

If decision step 52 is met, then controller 17 will turn off, or not operate, receiver 14, quality measure 15, and accuracy measure 16 for measurement of signals in the slots preceding the slot containing the desired signal. This may also be accomplished by directing selector to select neither antenna 11 nor antenna 12. The result is a significant power savings which will prolong the operating time of a battery of the communication unit.

The selected antenna is then coupled to the receiver, step 36 and the desired signal, when received, is measured, step 37. This is the information used to make the decision at decision step 52. In operation, even though switching to the second antenna may provide improved reception, it is expected that the previous antenna will provide at least adequate signal reception. Once the signal received fails to meet the quality threshold, the regular diversity process, subprocess 30, will be activated again.

Controller 17 then determines if the communication is completed, decision step 38. If completed, process 50 ends, step 54. If the communication is not completed, process 50 loops back to decision step 52.

Figure 7:
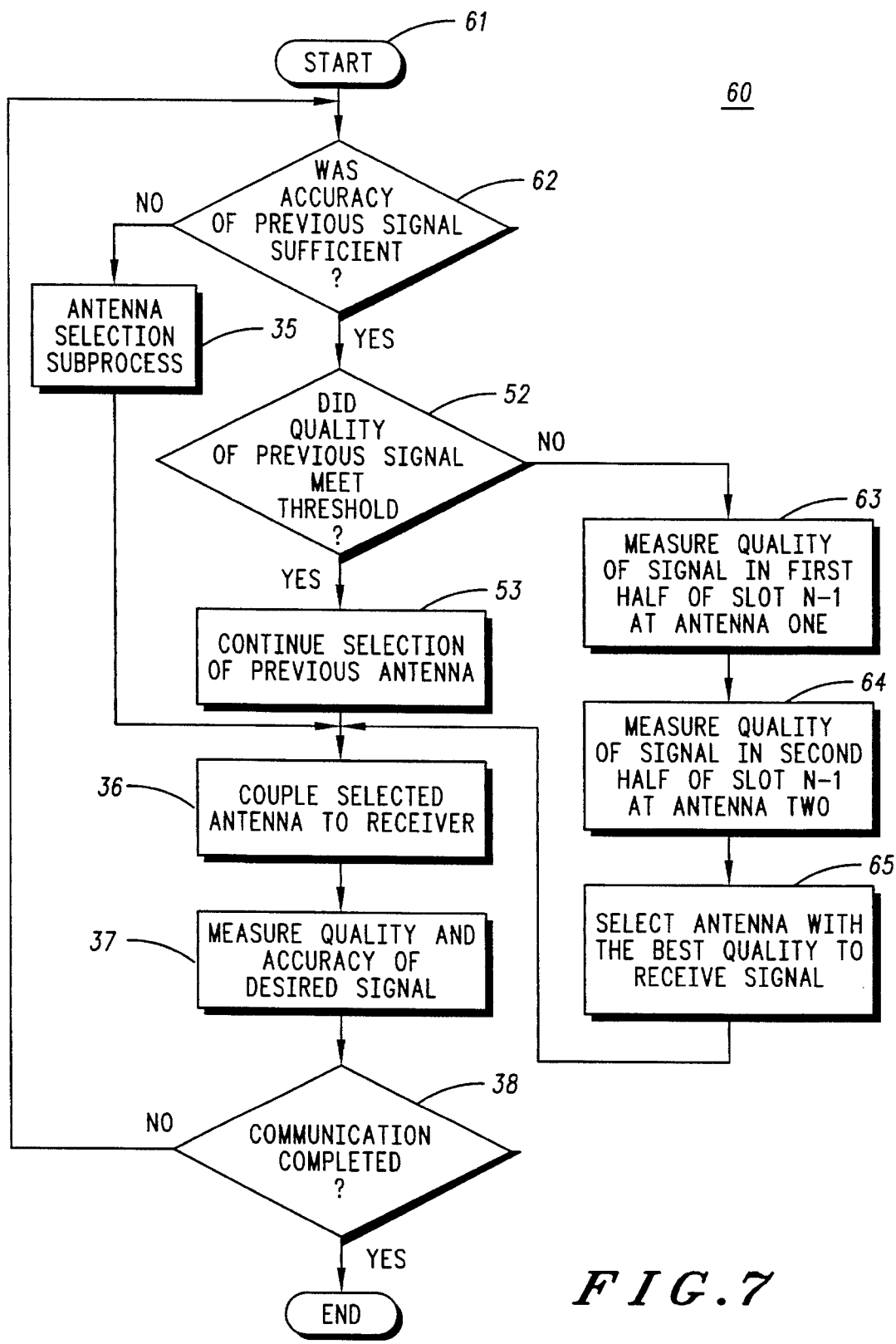
FIG. 7 is a flow chart representing a second embodiment of a switched diversity process utilizing the present invention.

In FIG. 7, a more detailed flow chart representing a second embodiment of the switched diversity process, generally designated 60, is provided. In process 60, a new decision step, step 62, is added at the beginning. This step determines if the accuracy of the previous signal was sufficient. For example, if accuracy is measured by the CRC, then the signal is designated as either good or bad. If the previous signal was bad, then subprocess 35, is instituted.

If the accuracy is good, process 60 determines if the quality of the previous signal meets the quality threshold, decision step 52. If the quality threshold is met, process 60 operates as in process 50 by continuing to use the previously selected antenna.

However, if the accuracy of the previous signal is good and the quality does not meet the desired threshold, then process 60 will proceed to step 63. In steps 63 and 64, process 60 will measure signal quality of a signal received at the two antennas. The difference here is that both antennas measure a signal within the same time slot and only look at the quality. While the information will not be as accurate as when a full time slot is used, it will be enough since it is known that the accuracy is sufficient. This procedure will only use a portion of the power used by subprocess 35 since the accuracy is not measured and the quality measurements are made in half the time.

The quality measurements are then compared and the antenna with the best results is selected for reception of the desired signal, step 65. Following subprocess 35 or steps 53 or 65, process 60 couples the selected antenna to the receiver, step 36. The received signal is then measured for quality and accuracy, step 37. Controller 17 next determines if the communication has ended, decision step 38. If ended, process 60 ends, step 66. If the communication has not ended, then process 60 loops back to decision step 62.

Thus, it will be apparent to one skilled in the art that there has been provided in accordance with the invention, a method for operating a switched diversity RF receiver that fully satisfies the objects, aims, and advantages set forth above.

While the invention has been described in conjunction with specific embodiments thereof, it is evident that many alterations, modifications, and variations will be apparent to those skilled in the art in light of the foregoing description. Accordingly, it is intended to embrace all such alterations, modifications, and variations in the appended claims.

I claim:

1. A method of operating a switched diversity receiver having a first antenna, a second antenna and a diversity selection process for selecting one of said first and second antennas, said method comprising the steps of:

receiving a desired signal in a first slot of a first frame of a communication channel using said first antenna;

measuring a quality of said desired signal received at said first antenna;

selecting said first antenna, prior to using said diversity selection process, to receive said desired signal in said first slot of said second frame if said quality of said desired signal meets a quality threshold; and selecting one of said first and second antennas based on said diversity selection process to receive said desired signal in a first slot of a second frame if said quality of said desired signal received at said first antenna in said first frame failed to meet said quality threshold.

2. The method of claim 1 wherein said switched diversity receiver is a time division multiple access (TDMA) receiver.

3. The method of claim 1 wherein said switched diversity receiver is a code division multiple access (CDMA) receiver.

4. The method of claim 1 wherein said quality of said desired signal is one of a carrier-to-interference ratio, carrier-to-interference and nose ratio, received signal strength indicator, frame erasure rate, bit error rate, and frame error rate.

5. The method of claim 1 wherein said step of selecting one of said first and second antennas based on said diversity selection process comprises the steps of:

measuring a quality of a first signal, preceding said desired signal, received by said first antenna;

measuring said quality of a second signal, preceding said desired signal, received by said second antenna; and selecting one of said first and second antennas based upon a comparison of said quality of said first and second signals.

6. A method of operating a switched diversity receiver having a first antenna and a second antenna, said method comprising the steps of:

receiving a previous signal in a first slot of a first frame of a communication channel, said previous signal being received through said first antenna;

measuring an accuracy of said previous signal;

measuring a quality of said previous signal;

selecting one of said first and second antennas by comparing said quality of a first signal preceding a desired signal, received through said first antenna, with said quality of a second signal preceding said desired signal, received through said second antenna, if said accuracy of said previous signal was insufficient;

selecting said first antenna if said accuracy of said previous signal was sufficient and said quality of said previous signal meets a threshold; and selecting one of said first and second antennas by comparing said quality of said first signal preceding said desired signal received through said first antenna with said quality of said first signal preceding said desired signal received through said second antenna if said accuracy of said previous signal was sufficient and said quality of said previous signal failed to meet said threshold.

7. The method of claim 6 wherein said switched diversity receiver is a time division multiple access (TDMA) receiver.

8. The method of claim 6 wherein said switched diversity receiver is a code division multiple access (CDMA) receiver.

9. The method of claim 6 wherein said quality of said previous signal is one of a carrier-to-interference ratio, carrier-to-interference and noise ratio, received signal strength indicator, frame erasure rate, bit error rate, and frame error rate.

10. The method of claim 6 wherein said step of measuring said accuracy of said previous signal comprises the step of cyclic redundancy checking said previous signal.

11. The method of claim 6 wherein said step of measuring said accuracy of said previous signal comprises the step of determining one of a frame erasure rate, bit error rate, and frame error rate.

12. A method of operating a switched diversity receiver having a first antenna and a second antenna, said method comprising the steps of:

(a) measuring an accuracy of a signal received in a first time slot of a first frame through said first antenna;

(b) measuring a quality of said signal received in said first time slot of said first frame through said first antenna;

(c) measuring said quality of a first preceding signal received through said first antenna during a first preceding time slot of a second frame if said accuracy of said signal received in said first time slot of said first frame is insufficient;

(d) measuring said quality of a second preceding signal received through said second antenna during a second preceding time slot of said second frame if said accuracy of said signal received in said first time slot of said first frame is insufficient;

(e) selecting, following steps (c) and (d), one of said first and second antennas based upon a comparison of said quality of said first and second preceding signals;

(f) measuring said quality of said first preceding signal received through said first antenna during said first preceding time slot of second frame if said quality of said signal received in said first time slot of said first frame fails to meet a threshold;

(g) measuring said quality of said first preceding signal received through said second antenna during said first preceding time slot of second frame if said quality of said signal received in said first time slot of said first frame fails to meet said threshold;

(i) selecting, following steps (f) and (g), one of said first and second antennas based upon a comparison of said quality of said first and second preceding signals; and (j) selecting said first antenna to receive said desired signal if said accuracy of said signal was sufficient and said quality of said signal meets said threshold.

13. The method of claim 12 wherein said switched diversity receiver is a time division multiple access (TDMA) receiver.

14. The method of claim 12 wherein said switched diversity receiver is a code division multiple access (CDMA) receiver.

15. The method of claim 12 wherein said quality of said signal is one of a carrier-to-interference ratio, carrier-to-interference and noise ratio, received signal strength indicator, frame erasure rate, bit error rate, and frame error rate.

16. The method of claim 12 wherein said step of measuring said accuracy of said previous signal comprises the step of cyclic redundancy checking said previous signal.

17. The method of claim 12 wherein said step of measuring said accuracy of said previous signal comprises the step of determining one of a frame erasure rate, bit error rate, and frame error rate.

* * * * *